US010232861B2

(12) United States Patent
Huang et al.

(10) Patent No.: US 10,232,861 B2
(45) Date of Patent: Mar. 19, 2019

(54) APPARATUS, METHOD AND SYSTEM FOR CONTROLLING A USER SITUATION AWARENESS MODIFICATION OF A USER OF A VEHICLE

(71) Applicant: Bayerische Motoren Werke Aktiengesellschaft, Munich (DE)

(72) Inventors: Guangbin Huang, Singapore (SG); Olga Sourina, Singapore (SG); Yan Yang, Singapore (SG); Alexander Koenig, Munich (DE); Josef Schumann, Munich (DE); Ralf Decke, Unterhaching (DE); Cornelia Denk, Munich (DE); Philipp Kerschbaum, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/788,119

(22) Filed: Oct. 19, 2017

(65) Prior Publication Data
US 2018/0043906 A1 Feb. 15, 2018

Related U.S. Application Data

(63) Continuation of application No. PCT/EP2015/058534, filed on Apr. 20, 2015.

(51) Int. Cl.
*G08B 23/00* (2006.01)
*B60W 50/14* (2012.01)
(Continued)

(52) U.S. Cl.
CPC ............ *B60W 50/14* (2013.01); *B60W 40/08* (2013.01); *B60W 50/16* (2013.01);
(Continued)

(58) Field of Classification Search
None
See application file for complete search history.

(56) References Cited

U.S. PATENT DOCUMENTS

2013/0131905 A1* 5/2013 Green ................. G05D 1/0055
701/23
2015/0094899 A1 4/2015 Hackenberg et al.

FOREIGN PATENT DOCUMENTS

DE 103 52 955 A1 6/2005
DE 10 2008 038 816 A1 2/2010
(Continued)

OTHER PUBLICATIONS

DE10352955A1, Audi; Driver assistance system for supporting the tracking of a motor vehicle and a device for operating the driver assistance system; Nov. 13, 2003; English Translation from Google.*
(Continued)

*Primary Examiner* — Adolf Dsouza
(74) *Attorney, Agent, or Firm* — Crowell & Moring LLP

(57) ABSTRACT

The invention relates to an apparatus that is configured to receive a first user detection signal comprising information usable for determining a user situation awareness level. The apparatus also includes a processing module configured to determine a currently necessary situation awareness level by selecting one predefined situation awareness level from a plurality of predefined situation awareness levels based on driving information. The processing module is configured to determine a current user situation awareness level based on the information usable for determining the user situation awareness level. The processing module is configured to generate a control signal to control a user situation awareness modification module based on the currently necessary situation awareness level and the current user situation awareness level.

19 Claims, 7 Drawing Sheets

(51) Int. Cl.
*B60W 50/16* (2012.01)
*B60W 40/08* (2012.01)
*G06K 9/00* (2006.01)

(52) U.S. Cl.
CPC ..... *G06K 9/00805* (2013.01); *G06K 9/00845* (2013.01); *B60W 2040/0818* (2013.01); *B60W 2540/22* (2013.01)

(56) References Cited

FOREIGN PATENT DOCUMENTS

| | | |
|---|---|---|
| DE | 10 2009 041 187 A1 | 2/2011 |
| DE | 10 2011 084 887 A1 | 4/2013 |
| DE | 10 2012 112 802 A1 | 6/2014 |
| DE | 10 2013 219 887 A1 | 4/2015 |

OTHER PUBLICATIONS

PCT/EP2015/058534, International Search Report dated Jan. 8, 2016 (Three (3) pages).

* cited by examiner

APPARATUS, METHOD AND SYSTEM FOR CONTROLLING A USER SITUATION AWARENESS MODIFICATION OF A USER OF A VEHICLE

CROSS REFERENCE TO RELATED APPLICATIONS

This application is a continuation of PCT International Application No. PCT/EP2015/058534, filed Apr. 20, 2015, the entire disclosure of which is herein expressly incorporated by reference.

BACKGROUND AND SUMMARY OF THE INVENTION

Embodiments relate to modifying situation awareness level of a user of a vehicle, and in particular to an apparatus for controlling a user situation awareness modification of a user of a vehicle, and a user situation awareness modification processing system.

Driver assistance system may partially or fully take over the lateral and/or longitudinal control of a vehicle. Warning systems may be used to warn drivers about dangerous situations which may occur while driving in partially autonomous or highly autonomous mode. However, such warnings may not always be delivered on time to the user. It is desired to improve in-vehicle driver assistance systems and manual driving systems to increase the safety of drivers, for example.

Document US2013/0131905 relates to provoking a response from a user of a vehicle to an artificially applied stimulus provided by the vehicle. Such a stimulus may be a beep from a speaker or a blink from a lamp, for example.

As such, there is a need to provide a concept for improving the safety of driving a vehicle.

Some aspects of the invention relate to an apparatus for controlling a user situation awareness modification of a user of a vehicle, comprising an input module configured to receive a first user detection signal comprising information usable for determining a user situation awareness level. The apparatus comprises a processing module configured to determine a currently necessary situation awareness level by selecting one predefined situation awareness level from a plurality of predefined situation awareness levels based on driving information. The processing module is configured to determine a current user situation awareness level based on the information usable for determining the user situation awareness level. The processing module is configured to generate a control signal to control a user situation awareness modification module based on the currently necessary situation awareness level and the current user situation awareness level.

Some aspects of the invention relate to a user situation awareness modification system. The user situation awareness modification system comprises at least one user detection module configured to repeatedly generate a first user detection signal comprising information usable for determining a user situation awareness level. The user situation awareness modification system comprises a processing module configured to determine a currently necessary situation awareness level by selecting one predefined situation awareness level from a plurality of predefined situation awareness levels based on driving information. The processing module is configured to determine a current user situation awareness level based on the information usable for determining the user situation awareness level. The processing module is configured to generate a control signal to control a user situation awareness modification module based on the currently necessary situation awareness level and the current user situation awareness level. The user situation awareness modification system comprises a user situation awareness modification module configured to modify a current user situation awareness level towards a currently necessary situation awareness level based on the control signal.

Some aspects of the invention relate to a method for controlling a user situation awareness modification of a user of a vehicle. The method comprises receiving a first user detection signal comprising information usable for determining a user situation awareness level. The method further comprises determining a currently necessary situation awareness level by selecting one predefined situation awareness level from a plurality of predefined situation awareness levels based on driving information. The method further comprises determining a current user situation awareness level based on the information usable for determining the user situation awareness level. The method further comprises generating a control signal to control a user situation awareness modification module based on the currently necessary situation awareness level and the current user situation awareness level.

Other objects, advantages and novel features of the present invention will become apparent from the following detailed description of one or more preferred embodiments when considered in conjunction with the accompanying drawings.

BRIEF DESCRIPTION OF THE DRAWINGS

Some embodiments of apparatuses and/or methods will be described in the following by way of example only, and with reference to the accompanying figures, in which.

DETAILED DESCRIPTION OF THE DRAWINGS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
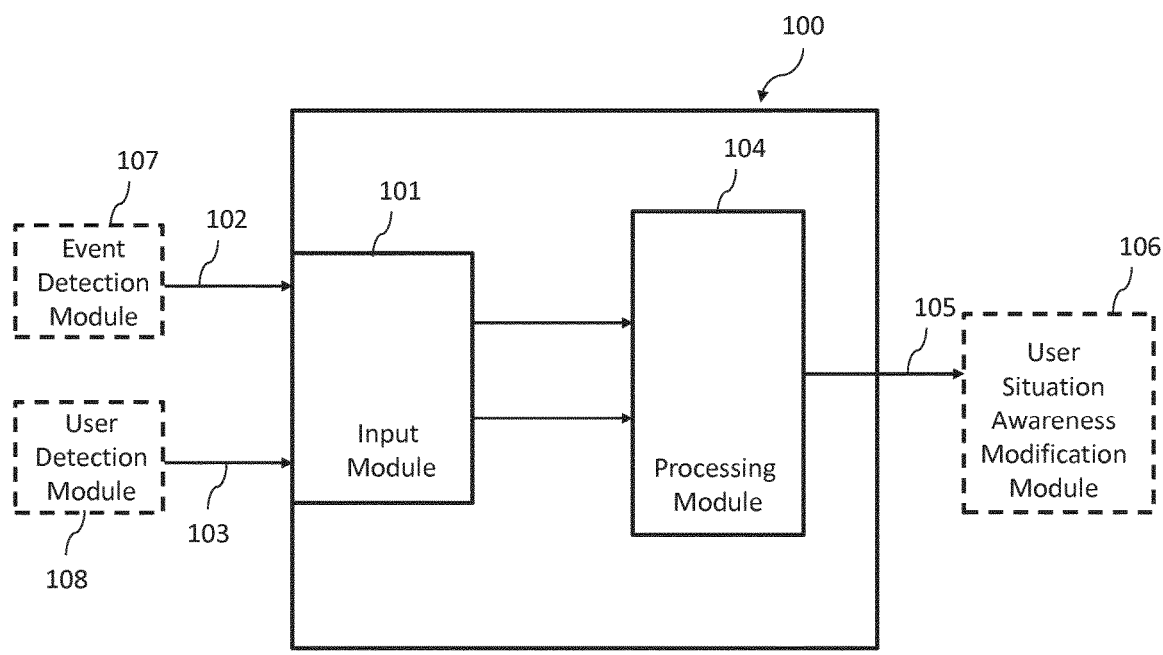
FIG. 1 shows a schematic illustration of an apparatus for controlling a user situation awareness modification of a user of a vehicle.

FIG. 1 shows a schematic illustration of an apparatus 100 for controlling a user situation awareness modification of a user of a vehicle.

The apparatus 100 includes an input module 101 configured to repeatedly receive a first event detection signal 102 including information related to a detected event outside a vehicle. The input module 101 is also configured to repeatedly receive a first user detection signal 103 including information related to a reaction or a missing reaction of a user to the detected event outside the vehicle.

The apparatus 100 further includes a processing module 104 configured to determine a user situation awareness level based on the information related to the detected event outside the vehicle and the information related to the reaction of the user to the detected event. The processing module 104 is further configured to generate a control signal 105 configured to control a user situation awareness modification module 106 based on the determined user situation awareness level.

Due to the input module 101 repeatedly receiving the first event detection signal 102 and repeatedly receiving the first user detection signal 103 including information related to a reaction or a missing reaction of a user to the detected event outside the vehicle, vehicle safety may be improved as the user's situation awareness may be continuously quantified and modulated to a desired level before dangerous situations occur. Furthermore, due to the determination of a user situation awareness level based on information related to a detected event outside the vehicle, the provision of additional or artificial stimuli through additional devices or circuits for provoking a reaction from the user to determine a user situation awareness level is not necessary, for example. Furthermore, comfort for the user of the vehicle may be improved if additional artificial stimuli (e.g. blinking light emitters or auditory commands) are not used, for example.

Situation awareness or a current situation awareness of a user or driver of the vehicle may be a reaction of the user to a detected event outside the vehicle, for example. For example, a user's situation awareness may be a recognition or reaction towards the detected event outside the vehicle. Situation awareness may be the perception of at least one environmental element with respect to time and/or space, the comprehension of its meaning, and the projection of its status after some variable has changed, such as time, or some other variable such as a predetermined event, for example.

The user situation awareness level may be determined based on different parameters related to the user (e.g. physiological data or non-physiological data) received by the input module 101. For example, the input module 101 may be configured to receive the first user detection signal 103 (carrying the information usable for determining a situation awareness of the user) from at least one sensor for measuring a pulse rate of the user, a skin conductance of the user, a gaze direction of the user, a gaze time of the user, a saccadic speed of the user, or image data related to the user and/or a time of change of a pulse rate of the user, a skin conductance of the user, a gaze direction of the user, a saccadic speed of the user, or image data related to the user.

The processing module 104 may be configured to determine the user situation awareness level based on the situation awareness parameter information from (or carried by) the first user detection signal 103. For example, the situation awareness parameter information may be physiological data related to the user, such as a pulse rate, skin conductance, gaze direction, gaze time, saccadic speed or image data information related to the user and/or a time of change of a pulse rate of the user, a skin conductance of the user, a gaze direction of the user, a saccadic speed of the user, or image data related to the user.

Additionally or optionally, the processing module 104 may be configured to determine the user situation awareness level based on non-physiological situation awareness parameter information related to the user from (or carried by) the first user detection signal 103. For example, the first user detection signal 103 may include a speed variation of the vehicle, acceleration variation of the vehicle or jerk information of the vehicle, which may be related to the reaction or a missing reaction of the user to the detected event outside the vehicle. The speed variation, acceleration or jerk information of the vehicle may be caused by the user, and may be indicative of whether situation awareness has been established concerning a detected event outside the vehicle.

The information related to the detected event outside the vehicle received by the input module may be information related to a position or a movement of an object outside the vehicle and/or a time of detection of the event outside the vehicle. For example, the object may be a person, another vehicle. For example, the detected event may relate to a or a non-light emitting object, for example.

The first event detection module may include or may be a radar sensor, a speed sensor, an image sensor or a distance sensor, for example. For example, a detected event may be an object entering a range of detection of the event detection module or a range of detection of a sensor of the event detection module.

The first event detection signal may include information related to a detected event outside the vehicle within a viewing angle between 0° and 30° (or e.g. between 0° and 15°) from a line of sight of the user, for example. Alternatively or optionally, the viewing angle may be between 0° and 30° (or e.g. between 0° and 15°) from an imaginary axis representing a direction of travel of the vehicle. Alternatively or optionally, the first detection signal may include information related to a detected event outside the vehicle, independently of the user's viewing angle or a driving direction of the vehicle. Alternatively or optionally, the first detection signal may include information related to a detected event outside the vehicle, within a threshold radius of between 30 m and 60 m (or e.g. within a range of between 0.1 m and 35 m) from the vehicle.

The input module 101 may be configured to repeatedly receive the first event detection signal 102 carrying information related to the detected event outside the vehicle at regular or predefined detection time intervals for example. For example, the input module 101 may be configured to receive the first event detection signal 102 periodically at regular or predefined detection time intervals. For example, the regular or predefined detection time interval may lie between 1 ms and 5 s, (or e.g. between 1 ms and 1 s, or e.g. between 1 ms and 500 ms).

The input module 101 may be configured to repeatedly receive the first event detection signal 102 from a first event detection module 107. The first event detection module 107 may be a component of the apparatus 100 or an external component connected to the apparatus 100.

For example, the input module 101 may be configured to repeatedly receive (at regular or predefined detection time intervals) a first event detection signal 102 including information related to a first detected event from a first event detection module 107.

Additionally or optionally, the input module 101 may be configured to receive a plurality of event detection signals from a plurality of different event detection modules. Each event detection module (e.g. a first event detection module 107 and a second event detection module) may include or may be a radar sensor, a speed sensor, an image sensor or a distance sensor, for example. For example, the information related to the detected events may include radar, speed, image or distance information about the different detected events.

The plurality of event detection modules may be arranged to detect events at different detection ranges or location outside the vehicle, for example. The different detection ranges or locations outside the vehicle may at least partially overlap, or may be non-overlapping regions, for example. For example, in addition to the first event detection signal 102, input module 101 may be configured to repeatedly receive (at regular or predefined detection time intervals) a second event detection signal including information related to the same first event or a second detected event from a second event detection module.

The processing module 104 may be configured to determine the user situation awareness level based on the information related to a reaction (or missing reaction) of the user to the first detected event. The processing module 104 may be configured to determine the user situation awareness level based on a reaction time between the detected event and a reaction or missing reaction of the user to the detected event.

For example, the time at which an event detection module detects an event (e.g. another vehicle turning towards a vehicle occupied by the user, or another vehicle entering the detection range of the event detection module) outside the vehicle may be the event detection time.

The time of change of the situation awareness parameter may be the time at which a change of the (physiological or non-physiological) situation awareness parameter is detected, for example.

The processing module 104 may be configured to determine the current user situation awareness level based on a (measured) user reaction time, which may the time measured between the event detection time and the time of change.

For example, if no change of the (physiological) situation awareness parameter is detected within a threshold reaction time, the processing module 104 may determine that no situation awareness has been established concerning the detected event outside the vehicle. If a change of the (physiological) situation awareness parameter (e.g. an increase in pulse rate) is detected within a threshold reaction time, the processing module 104 may determine that situation awareness has been established concerning the detected event outside the vehicle. Furthermore, the (measured) user reaction time may be used to determine the current situation awareness level of the user. For example, a slower user reaction time may be indicative of a lower situation awareness level and a faster user reaction time may be indicative of a higher situation awareness level.

Optionally, additionally or alternatively, the processing module 104 may determine whether the user has established situation awareness concerning a detected event outside the vehicle based on at least one situation awareness parameter. For example, if the user has looked at a car for longer than 150 milliseconds (e.g. a gaze time of greater than 150 ms), the processing module 104 may determine that the user has established situation awareness concerning this particular object.

Additionally, optionally or alternatively, the processing module 104 may be configured to determine the user situation awareness level based on a (measured) user reaction time between the event detection time at which an event outside the vehicle is detected and the time at which a change of the (non-physiological) situation awareness parameter (e.g. change in speed variation, acceleration or jerk information) is detected.

For example, if no change of the (non-physiological) situation awareness parameter is detected within a threshold reaction time, the processing module 104 may determine that no situation awareness has been established concerning the detected event outside the vehicle. If a change of the (physiological) situation awareness parameter (e.g. a slowing of the vehicle, an acceleration or a jerk of the vehicle) is detected within a threshold reaction time, the processing module 104 may determine that situation awareness has been established concerning the detected event outside the vehicle. The processing module 104 may thus determine that the user has established situation awareness concerning the detected event. Furthermore, the (measured) user reaction time may be used to determine the current situation awareness level of the user. For example, a slower user reaction time may be indicative of a lower situation awareness level and a faster user reaction time may be indicative of a higher situation awareness level.

The processing module 104 may be configured to repeatedly determine the situation awareness level of the user at regular or predetermined determination time intervals based on the first user detection signal 103 received from a user detection module at regular or predefined time intervals (e.g. periodically at regular or predefined detection time intervals). The regular or predefined detection time interval may lie between 1 ms and 5 s, (or e.g. between 1 ms and 1 s, or e.g. between 1 ms and 500 ms). In other words, the situation awareness level of the user is continuously monitored and determined at regular or predefined detection time intervals (e.g. even if no dangerous situation is present).

Additionally, alternatively or optionally, the input module 101 may be configured to receive more than one user detection signals, each comprising information related to a reaction or a missing reaction of a user to the detected event outside the vehicle. For example, the input module 101 may be configured to receive the first user detection signal 102 comprising information related to a reaction or a missing reaction of a user to the detected event outside the vehicle from a first user detection module 108 and a second user detection signal comprising information related to information related to a reaction or a missing reaction of a user to the detected event outside the vehicle from a second user detection module. The first user detection module 108 (and/or second user detection module) may be a component of the apparatus 100 or an external component connected to the apparatus 100.

The processing module 104 may be configured to determine the user situation awareness level based on the information related to the reaction or the missing reaction of the user to the detected event from the first user detection signal 102 and the information related to the reaction or the missing reaction of the user to the detected event from the second user detection signal.

Additionally or optionally, may be configured to repeatedly determine the situation awareness level of the user based on the first event detection signal 102 received from the first detection module and the second event detection signal received from the second detection module. For example, if no change of at least one (physiological or non-physiological) user situation awareness parameter is detected with respect to the first detected event detected by the first detection module 107 within a threshold reaction time, and a change of at least one (physiological or non-physiological) user situation awareness parameter is detected with respect to the second detected event detected by the second detection module 107, the processing module 104 may determine a lower current user situation awareness level. If a change of at least one (physiological or non-physiological) user situation awareness parameter is detected with respect to the first detected event detected by the first detection module 107 within a threshold reaction time, and a change of at least one (physiological or non-physiological) user situation awareness parameter is detected with respect to the second detected event detected by the second detection module 107, the processing module 104 may determine a higher current user situation awareness level.

The processing module 104 may be configured to determine a desired (e.g. required or currently necessary) user situation awareness level based on the detected event and/or at least one driving situation parameter such as a weather condition, a period of the day, a traffic condition, a speed of the vehicle, an acceleration of the vehicle, or a selectable level of autonomy of the user), for example.

The processing module 104 may be configured to repeatedly compare at regular or predetermined time intervals the determined user situation awareness level and the desired situation awareness level, for example. The processing module 104 may be configured to generate the control signal based on a comparison between the determined user situation awareness level and the desired (currently necessary) situation awareness level, for example.

The processor module 104 may be an independent hardware unit or part of a processor, a digital signal processor, a microcontroller or a computer program or a software product for running on a processor, a digital signal processor, a microcontroller, for example. The input module 101 may be an input interface (e.g. an input terminal on an input/output terminal of the processor module 104, for example.

The processing module 104 may be configured to generate the control signal 105 to repeatedly or continuously trigger a user situation awareness modification by the user situation awareness modification module 106 until the desired (currently necessary) user situation awareness level is reached, for example.

The processing module 104 may be configured to generate the control signal 105 which includes information for selecting at least one user situation awareness modification parameter to be varied by the user situation awareness modification module 106 from a plurality of controllable user situation awareness modification parameters. For example, the plurality of user situation awareness modification parameters may include a light level, a sound level, an odor, a temperature level, a degree of air flow, an oxygen level, or a haptic communication level.

The at least one user situation awareness modification parameter may be selected based on a modification intensity level associated with each user situation awareness modification parameter. The modification intensity level may be based on a harshness of the user situation awareness modification parameter or the effect it may have on the user.

The user situation awareness modification parameters may be classified according to their modification intensity level. Optionally, each user situation awareness modification parameters may have different modification intensity levels. For example, mild light from a light source may have a low modification intensity level (e.g. modification intensity level 1. Haptic communication may have a higher modification intensity level (e.g. modification intensity level 5.)

Additionally, optionally or alternatively, the user situation awareness modification parameters may be classified or sorted into different modification intensity levels, such that several user situation awareness modification parameters may have the same modification intensity level. For example, a first group of user situation awareness modification parameters of the plurality of user situation awareness modification parameters may be classified in or associated with a first modification intensity level and second group of user situation awareness modification parameters of the plurality of user situation awareness modification parameters may be classified in or associated with a second modification intensity level. Additionally, optionally or alternatively, a combination or pairing of several (e.g. two or more) user situation awareness modification parameters may be classified or allocated as having a certain modification intensity level. For example, low level air conditioning and mild lighting used in combination may have a modification intensity level 2.

The processing module 104 may be configured to select a first user situation awareness modification parameter (or a first pair or combination of user situation awareness modification parameters) from the plurality of controllable user situation awareness modification parameters during a first time interval and to select a second user situation awareness modification parameter (or a second pair or combination of user situation awareness modification parameters) during a subsequent second time interval if a modification of the current user situation awareness levels towards the currently necessary situation awareness level is too slow, for example.

For example, the first user situation awareness modification parameter (e.g. light) may be associated with a lower modification intensity level and the second user situation awareness modification parameter (haptic feedback) may be associated with a higher modification intensity level, for example. For example, during a first time interval, the first user situation awareness modification parameter (e.g. light) may be varied or adjusted and the user situation awareness level may be monitored (e.g. by the input module repeatedly receiving user detection signals). If the modification of the current user situation awareness levels towards the currently necessary situation awareness level is too slow (e.g. if the processing module 100 determines that there is not enough change in the situation awareness of the user), the processing module 104 may be configured to select the second user situation awareness modification parameter (which may be associated with a higher modification intensity level) to be varied or adjusted in the second time interval.

The user situation awareness modification module 106 may be configured to control a plurality of controllable user situation awareness modification parameters, for example. The plurality of user situation awareness modification parameters may be used as targeted, converted stimuli interventions which may be used to improve user situation awareness or to modify the user situation awareness to the desired user situation awareness level, for example.

Additionally or optionally, the at least one user situation awareness modification parameter may be selected based on a previously selected situation awareness modification parameter. For example, the processing module 104 may be configured select at least one user situation awareness modification parameter (e.g. the at least one user situation awareness modification parameter) based on previous modification of the user's situation awareness in response to the previously selected situation awareness modification parameter. For example, if the user has previously been non-responsive to lighting variation, the processing module 104 may select a situation awareness modification parameter other than light, for example.

The vehicle incorporating or including the apparatus 100 may be manual (e.g. partially automated) vehicle, for example. Optionally or alternatively, the vehicle incorporating or including the apparatus 100 may be a partly-autonomous vehicle. A partially autonomous system may operate both steering and pedals, for example. However, the driver may have to constantly monitor the system, or be aware about the status of the system and intervene if necessary. Optionally or alternatively, the vehicle may be a highly autonomous vehicle. A highly autonomous vehicle may drive itself, for example. The driver or user is not required to monitor the system and may be allowed be taken out of the loop (e.g. may not have to constantly monitor the system), for example. However, the driver or user may be expected (or may need) to regain control (or take over operation or driving) of the vehicle within between 10 s to 15 s, for example.

The vehicle (e.g. a partly-autonomous vehicle or a highly autonomous vehicle) may include a driver assistance system, which may partially or fully take over the lateral and/or longitudinal control (of the vehicle) and give or issue a take-over request (TOR) based on empirical human reaction thresholds, for example. During partially or highly automated driving, the vehicle (e.g. a car) may encounter situations in which the driver may be required to take over the driving task (e.g. emergency stopping or unexpected obstacles). This take-over has to happen within a time span of several seconds (TTT), for example, in case the car encounters a situation where the available sensory data do not provide enough information for an optimized decision making on vehicle maneuvering.

The processing module 104 may be configured to determine a predicted time-till-take-over based on the determined user situation awareness level. For example, there may be a need to quantify the driver's (or user's) current situation awareness for a precise estimation of the time till take over (TTT).

The desired (or currently necessary) situation awareness may be associated with a desired time-till takeover (TTT). The processing module 104 may be configured to determine a desired time-till-takeover based on the detected event outside the vehicle. The desired time-till-takeover may be determined based on a position or movement of an object outside the vehicle, for example. The desired time-till-takeover may be a desired time span within which the driver should take over a driving task or control of the vehicle (e.g. to prevent an accident or a collision), for example. For example, the desired time-till-takeover may be less than a predicted time-to-collision (TTC). For example, the time-to-collision (TTC) may be a time span between a take-over request (TOR) until the time when a collision would occur under constant environmental/driving conditions and continuous vehicle velocities, for example. The time-to-collision may be determined based on the first event detection signal 102 including information related to a detected event outside a vehicle, for example.

The processing module 104 is configured to generate the control signal 105 to trigger the user situation awareness modification by the user situation awareness modification module if the determined user situation awareness level indicates that a predicted time-till-takeover is larger than the desired time-till-takeover, for example. The time-till-takeover (TTT) may define a time span (e.g. during highly automated driving) and may be the time the driver needs to consecutively follow a take-over request (TOR). For example, if the car (or vehicle occupied by the user) requires the driver to take over the driving task, it may alert the driver in the take-over request (TOR). For example, the time-till-takeover (TTT) may be the time the driver needs to put his/her hands on the wheel, foot or feet on the pedals and to establish a basic understanding of situation awareness, for example. The time-till-takeover (TTT) may be the time from the alert to a conscious, appropriate steering and/or breaking and/or acceleration maneuver of the driver, for example.

The apparatus 100 may improve the driver assistance system by setting its parameters (e.g. an expected driver's reaction time) depending on the current situation awareness of the driver. For example: a system may keep a larger safety margin (distance) with the leading car if situation awareness is low, and smaller if situation awareness is high.

The processing module 104 may be configured to determine the currently necessary situation awareness level by selecting one of a plurality of predefined situation awareness levels based on the information related to a detected event from the first event detection signal 102 outside the vehicle. The processing module 104 may further be configured to generate the control signal 105 to control the user situation awareness modification module 106 based on the currently necessary situation awareness level and the (determined) user situation awareness level.

The processing module 104 may be configured to determine the currently necessary situation awareness level based on a driving situation parameter signal and the first event detection signal 102, for example. The driving situation parameter signals may include information related to a weather condition, a period of the day, a traffic condition, a speed of the vehicle, an acceleration of the vehicle, or a selectable level of autonomy of the user, for example. The processing module 104 may be configured to generate the control signal 105 to control the user situation awareness modification module 106 such that the situation awareness level of the user is modified towards the necessary situation awareness level.

The various examples described herein (e.g. the apparatus and the proposed method) quantifies the driver's situation awareness in real-time during partially or highly automated driving using (user) physiological data (e.g. information derived from the eyes) and/or car and environment related information, for example. Based on this quantification, an intervention may be implemented to control (user) situation awareness to a desired state at all times. The apparatus and/or method described herein further uses the most comfortable way of keeping situation awareness at a desired level, for example.

Figure 2:
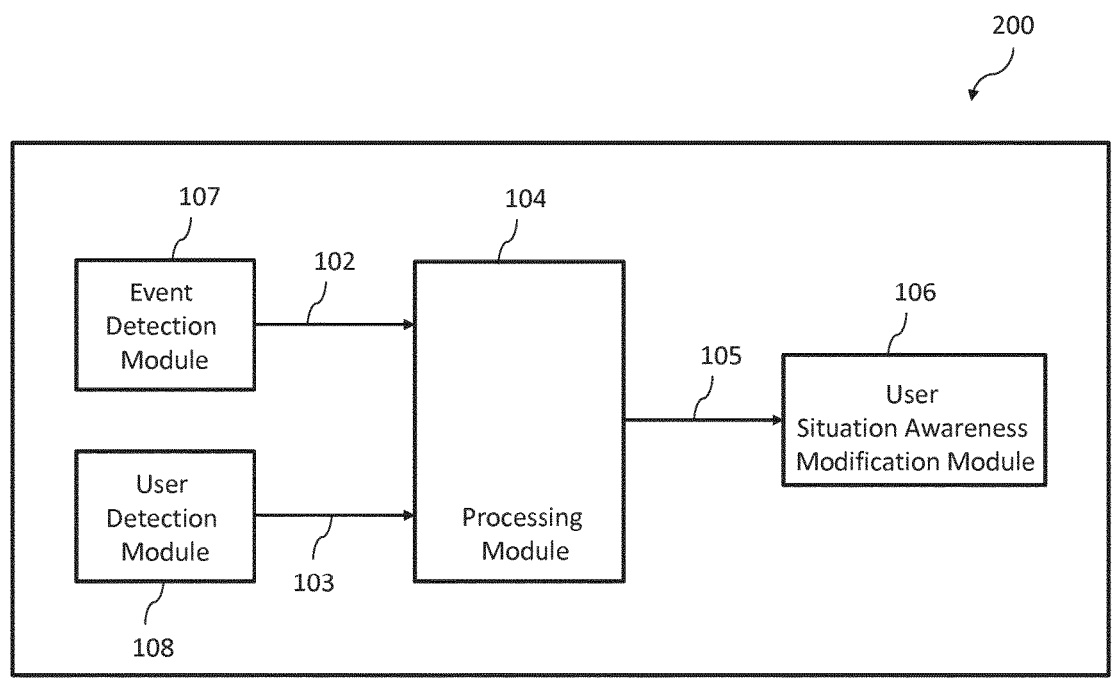
FIG. 2 shows a schematic illustration of a user situation awareness modification system.

FIG. 2 shows a schematic illustration of a user situation awareness modification system 200 according to an embodiment.

The user situation awareness modification system 200 includes at least one event detection module 107 configured to repeatedly generate a first event detection signal 102 including information related to a detected event outside a vehicle.

The user situation awareness modification system 200 further includes at least one user detection module 108 configured to repeatedly generate a first user detection signal 103 including information related to a reaction or a missing reaction of a user to the detected event outside the vehicle.

The user situation awareness modification system 200 further includes a processing module 104 configured to determine a user situation awareness level based on the information related to the reaction of the user to the detected event, and to generate a control signal 105 configured to control a user situation awareness modification module 106 based on the determined user situation awareness level.

The user situation awareness modification system 200 further includes a user situation awareness modification module 106 configured to modify a user situation awareness level based on the control signal 105.

By determining a user situation awareness level based on information related to a detected event outside the vehicle, additional or artificial stimuli through additional devices or circuits for provoking a reaction from the user is not necessary, for example. This reduces system complexity and improves comfort for the user of the vehicle. By repeatedly receiving the first event detection signal 102 and repeatedly receiving the first user detection signal 103, vehicle safety may be improved as the user's situation awareness may be continuously quantified and modulated to a desired level before dangerous situations occur.

More details and aspects are mentioned in connection with the embodiments described above or below. The embodiments shown in FIG. 2 may comprise one or more optional additional features corresponding to one or more aspects mentioned in connection with the proposed concept or one or more embodiments described above (e.g. FIG. 1) or below (e.g. FIGS. 3 to 7).

Figure 3:
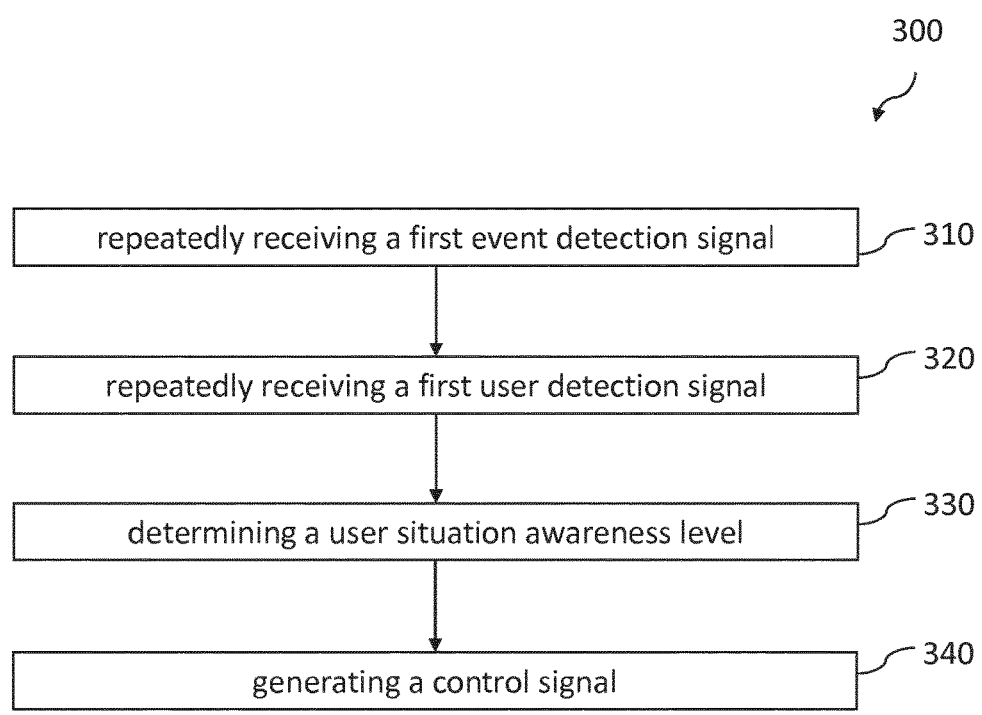
FIG. 3 shows a flow chart of a method for modifying a user situation awareness.

FIG. 3 shows a flow chart of a method 300 for controlling a user situation awareness modification of a user of a vehicle.

The method 300 includes repeatedly receiving (310) a first event detection signal including information related to a detected event outside a vehicle.

The method 300 further includes repeatedly receiving (320) a first user detection signal including information related to a reaction or a missing reaction of a user to the detected event outside the vehicle.

The method 300 further includes determining (330) a user situation awareness level based on the information related to the detected event outside the vehicle and the information related to the reaction of the user to the detected event.

The method 300 further includes generating (340) a control signal configured to control a user situation awareness modification module based on the determined user situation awareness level.

By determining a user situation awareness level based on information related to a detected event outside the vehicle, comfort for the user of the vehicle may be improved as additional artificial stimuli (e.g. blinking light emitters or auditory commands) are not used, for example. Furthermore, repeatedly receiving the first event detection signal and repeatedly receiving the first user detection signal including information related to a reaction or a missing reaction of a user to the detected event outside the vehicle, may improve vehicle safety as the user's situation awareness may be continuously quantified and modulated to a desired level before dangerous situations occur.

More details and aspects are mentioned in connection with the embodiments described above or below. The embodiments shown in FIG. 3 may comprise one or more optional additional features corresponding to one or more aspects mentioned in connection with the proposed concept or one or more embodiments described above (e.g. FIG. 1 or 2) or below (e.g. FIGS. 4 to 7).

Figure 4:
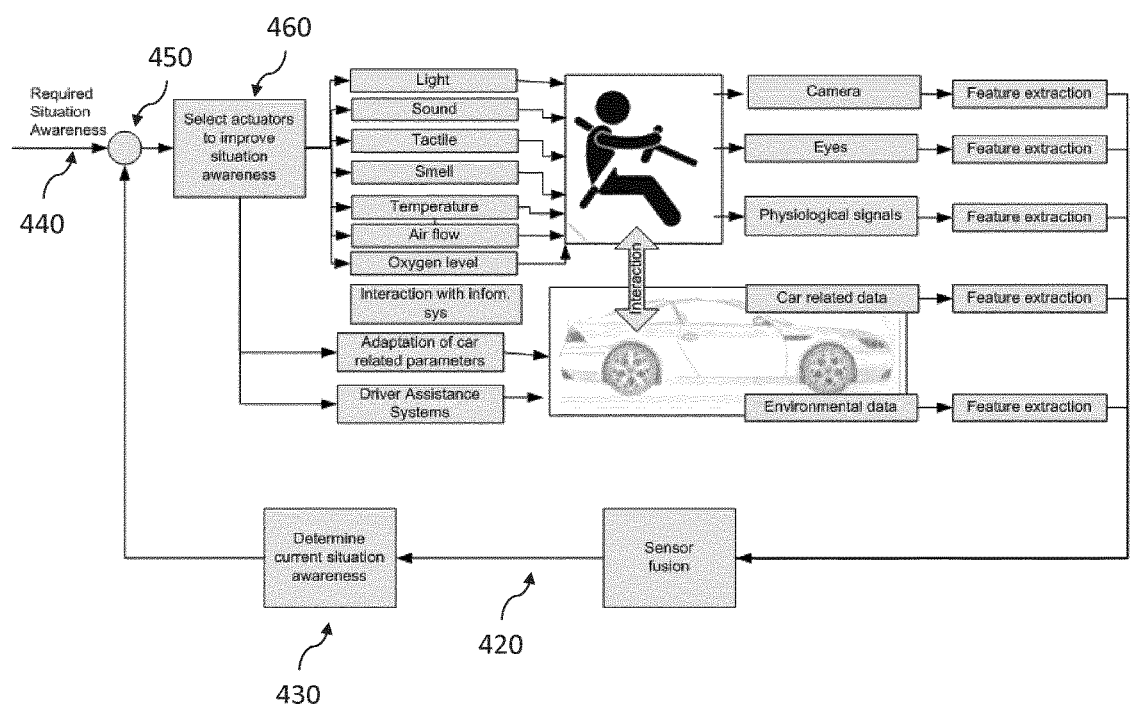
FIG. 4 shows a schematic illustration of details of a method for modifying a user situation awareness.

FIG. 4 shows a schematic illustration of details of a method for modifying a user situation awareness according to an embodiment.

The method 400 may be similar to the method described with respect to FIG. 3. For example, the method 400 may include one or more or all of the features of method 300 and/or other additional or optional features.

The method 400 may include determining a user situation awareness by receiving (in 420) at least one user detection signal, which may each include an extraction of features from a camera (e.g. visual or image data), and/or an extraction of features from the eyes, and/or an extraction of features from physiological signals. Additionally or optionally, the user situation awareness may be determined based on an extraction of features from car related data and/or environmental data.

The method 400 may quantify (or predict) user situation awareness without provoking a response to a stimulus, but through continuously monitoring behavior such as the pursuit of the driver's eyes following objects outside the car (e.g. other road users). For example, if the driver has looked at a car for longer than 150 milliseconds, it may be assumed that situation awareness has been established concerning this particular object. The situation awareness of the user may be identified (e.g. measured) through correlation of image based data (e.g. video data from the face), physiological data (e.g. heart rate, skin conductance), information derived from the eyes (e.g. gaze directions and saccadic speed), car related information (e.g. speed and acceleration), environment related information (e.g. surrounding vehicles). Furthermore, information from different sensor sources may be fused (sensor fusion) to develop machine learning algorithms for intelligent decision of current level of situation awareness in real-time. These may be used in addition the continuous monitoring of situation awareness through the observation of the (pursuit) behavior of a user's eyes when tracking objects, for example.

One or more or all of the extraction of features may be used to determine a current user situation awareness level (in 430). The method 400 may include quantifying situation awareness (in 430) during driving (e.g. partially and highly automated driving) via information derived from a driver's body, face, brain, as well as the environment and the vehicle.

The method 400 may include determining (in 440) the desired (currently necessary or required) user situation awareness level, for example.

The method 400 may include comparing (in 450) (repeatedly at regular or predetermined time intervals) the (repeatedly) determined user situation awareness level and the desired situation awareness level, for example.

The method 400 may further include consecutive modulating of the level of situation awareness (in 460) via visual, auditory, olfactory and tactile stimuli. For example, a processing module may be configured to generate a control signal for selecting actuators to improve the user situation awareness based on the comparison between the determined user situation awareness level and the desired (currently necessary) situation awareness level, for example.

The method 400 may also be implemented in manual vehicles (e.g. in partially automated driving where the user is not alerted using a visual or auditory stimulus). The situation awareness may be kept at an optimized level at all times even during manual driving.

In addition to quantifying the level of situation awareness, the car (or vehicle) may take counter measures to increase the driver's situation awareness if it determines that the driver cannot take over control of the driving task within the TTT.

The vehicle (or the processing module) may actively modulate situation awareness to keep it at a desired state by adapting car-related parameters, for example. The situation awareness may be continuously modulated to the desired level via targeted, concerted intervention of stimuli in the following forms: visual (light), auditory (sound), haptic (tactile feedback), olfactory (smell), e.g. temperature, air flow (e.g. gentle breeze), an oxygen level, or interaction with an information system based upon the specific requirements, demands or needs of the driver. In other words, intervention is not only executed when a critical situation has been detected but situation awareness will be kept at a desired level. For example, falling asleep would not be allowed, and actions would have been taken at a much earlier stage. The user situation awareness may also be modified to adapt driver assistance systems, e.g. for modifying a predicted time-till-takeover to desired time-till-takeover, for example.

By continuously quantifying and modulating a user's situation awareness to a desired level at regular or predefined intervals, a dangerous situation may be detected and situation awareness may be established before it is too late. If the vehicle only requires the driver to respond once it feels the need to hand the driving task over to the user (e.g. in a dangerous situation), the user may not be able to establish a high level situation awareness in time. This can lead to dangerous situations, e.g. when the driver falls asleep and cannot establish situation awareness quickly enough before action is required, for example. Such situations may be prevented or reduced by the various examples described herein. In other words, to maintain an optimized situation awareness, the car may constantly monitor the driver, and quantify the driver's understanding of the current traffic situation to determine whether the driver is in the level of situation awareness that permits him/her to take over the driving task in time, for example.

The determination of user situation awareness according to the various examples described herein, avoids the challenges of quantifying situation awareness through analysis of subjective rating (e.g. questionnaires, surveys), or through brain signals (e.g. evoked potentials), which can be recorded and quantified in brain waves. The latter methods may be challenging (or not viable) during driving, For example, the car cannot ask the driver for voluntary input (or rely on objective data when doing so). Recording of brain signals during driving may be impractical during driving at this point in time due to the discomfort of wearing EEG (electroencephalography) devices and the artifacts involved in real driving environment.

Quantifying situation awareness may be carried out by analysis of behavioral data (e.g. task performance in the driving simulator) or body position, or a combination of physiological and gaze data in reaction to visual or auditory stimuli (e.g. a blinking light or an auditory command). The various examples described herein reduce (or eliminate) the need for quantifying the performance of an operator during execution or surveillance of a task by presenting (additional) information or sounding an alarm at when a dangerous situation has been detected (e.g. quantifying attention as a reaction to an active stimulus provided by the vehicle such as a beep from a speaker or a blink from a lamp). Attention and situation awareness (the perception, comprehension, and projection of all environmental elements in continuous time and space) may both be improved, for example.

The various examples described herein may improve a performance of a driver during driving, a pilot during flying or a diver during diving, for example.

More details and aspects are mentioned in connection with the embodiments described above or below. The embodiments shown in FIG. 4 may comprise one or more optional additional features corresponding to one or more aspects mentioned in connection with the proposed concept or one or more embodiments described above (e.g. FIGS. 1 to 3) or below (e.g. FIGS. 5 to 7).

More details and aspects are mentioned in connection with the embodiments described above or below. The embodiments shown in FIG. 4 may comprise one or more optional additional features corresponding to one or more aspects mentioned in connection with the proposed concept or one or more embodiments described above (e.g. FIGS. 1 to 3) or below (e.g. FIGS. 5 to 7).

Figure 5:
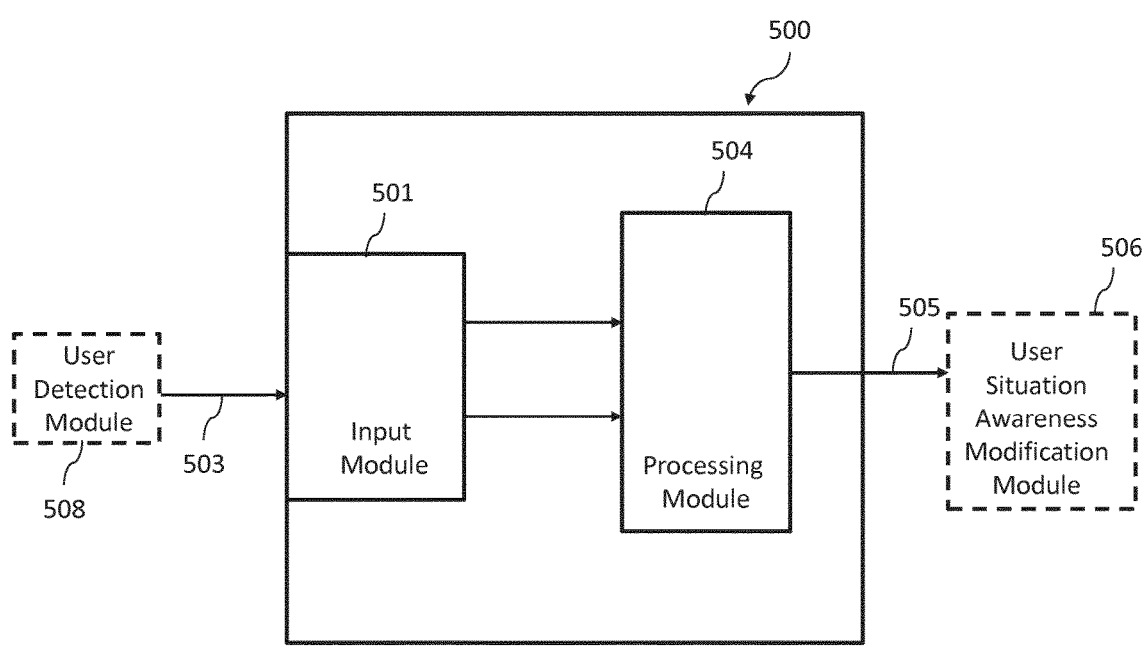
FIG. 5 shows a schematic illustration of a further apparatus for controlling a user situation awareness modification of a user of a vehicle by selecting one situation awareness level from a plurality of situation awareness levels.

FIG. 5 shows a schematic illustration of an apparatus 500 for controlling a user situation awareness modification of a user of a vehicle.

The apparatus 500 includes an input module 501 configured to receive a first user detection signal 503 including information usable for determining a user situation awareness level.

The apparatus 500 further includes a processing module 504 configured to determine a currently necessary situation awareness level by selecting one predefined situation awareness level from a plurality of predefined situation awareness levels based on driving information. The processing module 504 is configured to determine a current user situation awareness level based on the information usable for determining the user situation awareness level. The processing module 504 is configured to generate a control signal 505 to control a user situation awareness modification module 506 based on the currently necessary situation awareness level and the current user situation awareness level.

Due to the processing module determining the currently necessary situation awareness level by selecting one predefined situation awareness level from a plurality of predefined situation awareness levels, modification of the current user situation awareness by the processing module may be carried out more accurately and safety of the vehicle may be improved, for example. Furthermore, a smooth and more comfortable user situation awareness modification may be implemented due to the more accurate user situation awareness classification.

The first user detection signal 503 received by the input module 501 may include information usable for determining a user situation awareness level and may be similar to the first user detection signal described with respect to FIGS. 1 to 4. For example, the information usable for determining the current user situation awareness level may include (physiological) information related to a pulse rate of the user, a skin conductance of the user, a gaze direction of the user, a saccadic speed of the user, or image data related to the user and/or a time of change of a pulse rate of the user, a skin conductance of the user, a gaze direction of the user, a saccadic speed of the user, or image data related to the user. The information usable for determining the current user situation awareness level may include (non-physiological) information such as speed variation of the vehicle, acceleration variation of the vehicle or jerk information of the vehicle caused by the user. The first user detection signal 503 may be received from a user detection module 508, for example.

The determined user situation awareness level may be used to predict or estimate a user's current reaction time or a current time-till takeover (TTT). The currently necessary situation awareness level may be associated with a desired (or required) time-till takeover (TTT) or a desired (or required) user reaction time.

For example, the processing module 104 may be configured to determine the currently necessary situation awareness level based on the driving information. Optionally, the currently necessary situation awareness level may be associated with a desired (or required) time-till-takeover. The desired (or required) time-till-takeover may be a desired (or required) time span within which the driver should take over a driving task or control of the vehicle (e.g. to prevent an accident or a collision), for example. For example, the desired (or required) time-till-takeover may be less than a predicted time-to-collision (TTC). Optionally, the currently necessary situation awareness level may be associated with a desired (or required) user reaction time (e.g. a desired alertness or a reflex time).

Each predetermined situation awareness level of the plurality of predefined situation awareness levels may be associated with a different desired user reaction time or a different desired time-to-takeover. The processing module 504 may be configured to generate the control signal to control the user situation awareness modification module to trigger a modification of a predicted user reaction time (associated with the current user situation awareness level) to a desired user reaction time (associated with the currently necessary situation awareness level), for example.

The processing module 504 may be configured to determine the currently necessary situation awareness level by selecting the one predefined situation awareness level based on the driving information. The driving information may include information related to at least one driving situation parameter and/or information related to a detected event outside the vehicle.

The information related to the detected event outside the vehicle may be information related to a position or a movement of an object outside the vehicle and/or a time of detection of the event outside the vehicle, for example. For example, the input module 501 may be configured to receive a first event detection signal including the information related to a position or a movement of the object outside the vehicle from a radar sensor, a speed sensor, an image sensor or a distance sensor (as described with respect to FIG. 1). The at least one driving situation parameter may be related to a weather condition, a period of the day, a traffic condition, a speed of the vehicle, an acceleration of the vehicle, or a selectable level of autonomy of the user, for example. The input module 501 may be configured to receive the at least one driving situation parameter information from at least one sensor (e.g. a light or rain sensor) for providing information related to a weather condition or period of the day. Optionally, additionally or alternatively, the input module 501 may be configured to receive information related to a traffic condition (e.g. from data carriers or from input by a user). Optionally, additionally or alternatively, the input module 501 may be configured to receive information related to a level of autonomy (e.g. manual driving, partly autonomous driving or highly autonomous driving), which may be input by a user, or based on a default selection.

The processing module 504 may be configured to determine the currently necessary situation awareness level at regular or predefined time intervals based on the driving information by repeatedly selecting the one predefined situation awareness level from the plurality of predefined situation awareness levels. The regular or predefined determination time interval may lie between 1 ms and 5 s, (or e.g. between 1 ms and 1 s, or e.g. between 1 ms and 500 ms).

The processing module 504 may be configured to generate the control signal based on a comparison between the current user situation awareness level and the currently necessary situation awareness level. The processing module 504 may be configured to trigger the user situation awareness modification by the user situation awareness module if the current user situation awareness level is lower than the currently necessary situation awareness level, for example. The processing module 504 may be configured to generate the control signal to control the user situation awareness modification module to trigger a modification of the current user situation awareness level to the currently necessary situation awareness level. The processing module 504 may be configured to generate the control signal to repeatedly or continuously trigger a user situation awareness modification by the user situation awareness modification module until the currently necessary user situation awareness level is reached, for example.

The plurality of predefined situation awareness levels may be predetermined and/or pre-stored in a storage module (e.g. in a look up table) of the apparatus.

The processing module 504 may be configured to determine a currently necessary transition time threshold value based on the driving information. For example, the currently necessary transition time threshold value may be determined or calculated based on at least one driving situation parameter and/or information related to a detected event outside the vehicle. For example, the currently necessary transition time threshold value may represent a maximum allowable threshold time for modifying the current user situation awareness level to reach the currently necessary situation awareness level.

Alternatively, additionally or optionally, the processing module 504 may be configured to determine the currently necessary transition time based on at least one predetermined temporal value associated with the selected predefined situation awareness level. Alternatively or optionally, the currently necessary transition time may be a fixed (predetermined) temporal value. Alternatively or optionally, each predefined situation awareness level may have a predetermined temporal value associated with that predefined situation awareness level. Alternatively or optionally, the currently necessary transition time may be determined based on a difference between the current user situation awareness level and the currently necessary situation awareness level. For example, if a larger difference between the current user situation awareness level and the currently necessary situation awareness level is detected, then processing module may calculate a shorter transition time.

The control signal 505 generated by the processing module 504 may include information for selecting at least one user situation awareness modification parameter to be varied by the situation awareness modification module for modifying the current user situation awareness level towards the currently necessary situation awareness level. The control signal 505 may include information for selecting the at least one user situation awareness modification parameter from a plurality of controllable user situation awareness modification parameters. The plurality of user situation awareness modification parameters may include a light level, a sound level, an odor, a temperature level, a degree of air flow, an oxygen level, or a haptic communication level.

Each user situation awareness modification parameter may be associated with a modification intensity level for modifying the current user situation awareness level towards the currently necessary situation awareness level. The processing module 504 may be configured to generate the control signal to modify (or to trigger a modification of) the current user situation awareness level to reach the currently necessary situation awareness level within the currently necessary transition time threshold value. Therefore, the processing module may be configured to select one user situation awareness modification parameter or a combination of user situation awareness modification parameters having a modification intensity level suitable for modifying the current user situation awareness level towards the currently necessary situation awareness level within the currently necessary transition time threshold value, for example.

The processing module 504 may be configured to select a first user situation awareness modification parameter (or a first pair or combination of user situation awareness modification parameters) associated with a lower modification intensity level during a first time interval and to select a second user situation awareness modification parameter (or a first pair or combination of user situation awareness modification parameters or a combination of the first user situation awareness modification parameter and the second user situation awareness modification parameter) associated with a higher modification intensity level during a subsequent second time interval if a modification of the current user situation awareness levels towards the currently necessary situation awareness level is too slow, for example. Additionally or optionally, the at least one user situation awareness modification parameter may be selected based on the currently necessary transition time threshold value.

For example, the processing module 504 may determine a currently necessary transition time threshold value (e.g. 5 s) based on the driving information. (For example, the current user situation awareness levels should be modified to reach the currently necessary situation awareness level within 5 s to prevent a collision.) The processing module 504 may be configured to select a first user situation awareness modification parameter to be varied (e.g. light) to modify the current user situation awareness level. During the first time interval (e.g. during the first 2 s), first user situation awareness modification parameter (e.g. light) may be varied or adjusted and the user situation awareness level may be monitored (e.g. by the input module repeatedly receiving user detection signals). If the modification of the current user situation awareness levels towards the currently necessary situation awareness level is too slow (e.g. if the processing module 504 determines that the current user situation awareness level will not reach the currently necessary situation awareness level within the currently necessary transition time threshold value), the processing module 504 may be configured to select a second user situation awareness modification parameter (which may be associated with a higher modification intensity level) to be varied or adjusted.

Additionally or optionally, the processing module 504 may be configured to select consecutively more than two different user situation awareness modification parameters. Additionally or optionally, the processing module 504 may be configured to select two or more different user situation awareness modification parameters for modifying the current user situation awareness level towards the currently necessary situation awareness level within the currently necessary transition time threshold value.

The required level of situation awareness may be determined at any point in the foreseeable future, and assuming the highest required situation awareness ("worst case") in the non-foreseeable future (i.e. at the end of the prediction time window). The processing module may be configured to determine a time (e.g. a currently necessary transition time threshold value) for modifying the current user situation awareness level to reach the desired (required or currently necessary) situation awareness level. Measures may be taken for any indicated situation awareness level increase within the determined time window. For example, if there is little time, situation awareness may be increased by one or more faster (but potentially harsher) measures. If there is sufficient time, situation awareness may be increase using slower (but potentially more comfortable) measures, for example.

Additionally, alternatively or optionally, the processing module may be configured to select the at least one user situation awareness modification parameter based on a previous modification of a previous user situation awareness level towards a previously necessary situation awareness level.

More details and aspects are mentioned in connection with the embodiments described above or below. The embodiments shown in FIG. 5 may comprise one or more optional additional features corresponding to one or more aspects mentioned in connection with the proposed concept or one or more embodiments described above (e.g. FIGS. 1 to 4) or below (e.g. FIGS. 6 to 7).

Figure 6:
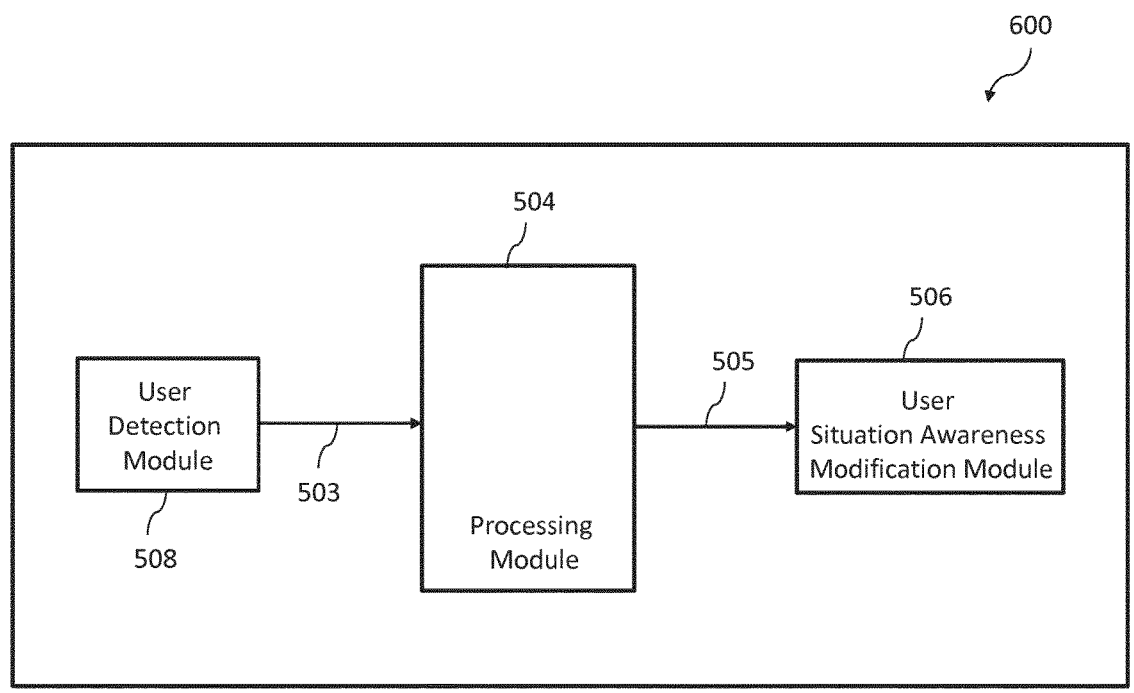
FIG. 6 shows a schematic illustration of a further user situation awareness modification system.

FIG. 6 shows a schematic illustration of a user situation awareness modification system 600.

The user situation awareness modification system 600 includes at least one user detection module 508 configured to repeatedly generate a first user detection signal 503 including information usable for determining a user situation awareness level.

The user situation awareness modification system 600 further includes a processing module 504 configured to determine a currently necessary situation awareness level by selecting one predefined situation awareness level from a plurality of predefined situation awareness levels based on driving information. The processing module is configured to determine a current user situation awareness level based on the information usable for determining the user situation awareness level. The processing module is configured to generate a control signal 505 to control a user situation awareness modification module 506 based on the currently necessary situation awareness level and the current user situation awareness level.

The user situation awareness modification system 600 further includes a user situation awareness modification module 506 configured to modify a current user situation awareness level towards a currently necessary situation awareness level based on the control signal.

By determining the currently necessary situation awareness level by selecting one predefined situation awareness level from a plurality of predefined situation awareness level, modification of the current user situation awareness by the processing module may be carried out more accurately and safety of the vehicle may be improved.

More details and aspects are mentioned in connection with the embodiments described above or below. The embodiments shown in FIG. 6 may comprise one or more optional additional features corresponding to one or more aspects mentioned in connection with the proposed concept or one or more embodiments described above (e.g. FIGS. 1 to 5) or below (e.g. FIG. 7).

Figure 7:
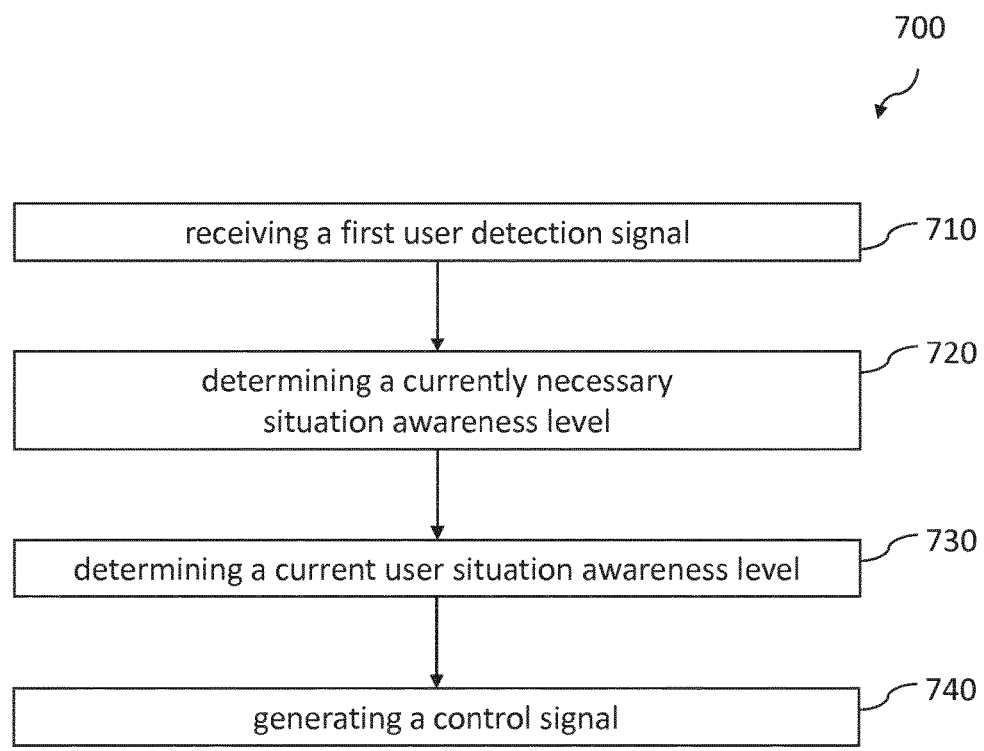
FIG. 7 shows a flow chart of a method for modifying a user situation awareness by selecting one situation awareness level from a plurality of situation awareness levels.

FIG. 7 shows a flow chart of a method 700 for controlling a user situation awareness modification of a user of a vehicle.

The method 700 includes receiving a first user detection signal including information usable for determining a user situation awareness level.

The method 700 further includes determining a currently necessary situation awareness level by selecting one predefined situation awareness level from a plurality of predefined situation awareness levels based on driving information.

The method 700 further includes determining a current user situation awareness level based on the information usable for determining the user situation awareness level.

The method 700 further includes generating a control signal to control a user situation awareness modification module based on the currently necessary situation awareness level and the current user situation awareness level.

By determining the currently necessary situation awareness level by selecting one predefined situation awareness level from a plurality of predefined situation awareness level, modification of the current user situation awareness by the processing module may be carried out more accurately and safety of the vehicle may be improved.

More details and aspects are mentioned in connection with the embodiments described above or below. The embodiments shown in FIG. 6 may comprise one or more optional additional features corresponding to one or more aspects mentioned in connection with the proposed concept or one or more embodiments described above (e.g. FIGS. 1 to 6) or below.

Aspects and features (e.g. the apparatus, the input module, the processing module, the event detection signal, the user detection signal, the user situation awareness modification module, the user situation awareness modification, the plurality of situation awareness levels, the regular or predetermined time intervals, the situation awareness modification parameters, the user detection module and the event detection module) mentioned in connection with one or more specific examples may be combined with one or more of the other examples.

Various examples may also relate to a machine readable storage (e.g. a computer). The machine readable storage may include machine readable instructions, when executed, to implement a method or realize an apparatus as described in any of the examples described herein.

Various examples relate to a method and/or apparatus for quantifying and modulating situation awareness during driving. Various examples relate to a method and/or apparatus for quantifying situation awareness during partially and highly automated driving via information derived from a driver's body, face, brain, as well as the environment and the vehicle, and consecutive modulating the level of situation awareness via visual, auditory, olfactory and tactile stimuli.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus configured to control a user situation awareness modification of a user of a vehicle, the apparatus comprising:
   an input module configured to receive a first user detection signal comprising information usable for determining a user situation awareness level; and
   a processing module configured to determine a currently necessary situation awareness level by selecting one predefined situation awareness level from a plurality of predefined situation awareness levels based on driving information,
   wherein the processing module is configured to determine a current user situation awareness level based on the information usable for determining the user situation awareness level,
   wherein the processing module is configured to generate a control signal to control a user situation awareness modification module based on the currently necessary situation awareness level and the current user situation awareness level, and
   wherein each of the plurality of predefined situation awareness levels is associated with a different desired user reaction time or a different desired time-to-takeover.

2. The apparatus according to claim 1, wherein the processing module is configured to generate the control signal to control the user situation awareness modification module to trigger a modification of the current user situation awareness level to the currently necessary situation awareness level.

3. The apparatus according to claim 1, wherein the processing module is configured to generate the control signal to modify the current user situation awareness level to reach the currently necessary situation awareness level within a currently necessary transition time threshold value.

4. The apparatus according to claim 3, wherein the processing module is configured to determine the currently necessary transition time threshold value based on at least one of the driving information and at least one predetermined temporal value associated with the selected predefined situation awareness level.

5. The apparatus according to claim 1, wherein the control signal generated by the processing module comprises information for selecting at least one user situation awareness modification parameter to be varied by the situation awareness modification module for modifying the current user situation awareness level towards the currently necessary situation awareness level.

6. The apparatus according to claim 5, wherein the control signal comprises information for selecting the at least one user situation awareness modification parameter from a plurality of controllable user situation awareness modification parameters.

7. The apparatus according to claim 5, wherein each user situation awareness modification parameter is associated with a modification intensity level for modifying the current user situation awareness level towards the currently necessary situation awareness level.

8. The apparatus according to claim 5, wherein the at least one user situation awareness modification parameter is selected based on a currently necessary transition time threshold value.

9. The apparatus according to claim 5, wherein the processing module is configured to select at least one user situation awareness modification parameter based on a previous modification of a previous user situation awareness level towards a previously necessary situation awareness level.

10. The apparatus according to claim 8, wherein the processing module is configured to select a first user situation awareness modification parameter associated with a lower modification intensity level during a first time interval and to select a second user situation awareness modification parameter associated with a higher modification intensity level during a second time interval if a modification of the current user situation awareness levels towards the currently necessary situation awareness level is too slow.

11. The apparatus according to claim 1, wherein the processing module is configured to generate the control signal to repeatedly or continuously trigger a user situation awareness modification by the user situation awareness modification module until the currently necessary user situation awareness level is reached.

12. The apparatus according to claim 1, wherein the processing module is configured to determine the currently necessary situation awareness level at regular or predefined time intervals based on the driving information by repeatedly selecting one predefined situation awareness level from the plurality of predefined situation awareness levels.

13. The apparatus according to claim 1, wherein the processing module is configured to:
generate the control signal based on a comparison between the current user situation awareness level and the currently necessary situation awareness level, and
to trigger a user situation awareness modification by the user situation awareness module if the current user situation awareness level is lower than the currently necessary situation awareness level.

14. The apparatus according to claim 1, wherein the driving information comprises information related to at least one driving situation parameter and/or information related to a detected event outside the vehicle.

15. The apparatus according to claim 14, wherein the information related to the detected event outside the vehicle is information related to a position or a movement of an object outside the vehicle and/or a time of detection of the event outside the vehicle.

16. The apparatus according to claim 1, wherein the information usable for determining the current user situation awareness level comprises information related to a pulse rate of the user, a skin conductance of the user, a gaze direction of the user, a saccadic speed of the user, or image data related to the user and/or a time of change of a pulse rate of the user, a skin conductance of the user, a gaze direction of the user, a saccadic speed of the user, or image data related to the user.

17. The apparatus according to claim 1, wherein the information usable for determining the current user situation awareness level comprises speed variation of the vehicle, acceleration variation of the vehicle or jerk information of the vehicle caused by the user.

18. A partly-autonomous or highly autonomous vehicle comprising an apparatus configured to control a user situation awareness modification of a user of a vehicle, the apparatus comprising:
an input module configured to receive a first user detection signal comprising information usable for determining a user situation awareness level; and
a processing module configured to determine a currently necessary situation awareness level by selecting one predefined situation awareness level from a plurality of predefined situation awareness levels based on driving information,
wherein the processing module is configured to determine a current user situation awareness level based on the information usable for determining the user situation awareness level,
wherein the processing module is configured to generate a control signal to control a user situation awareness modification module based on the currently necessary situation awareness level and the current user situation awareness level, and
wherein each of the plurality of predefined situation awareness levels is associated with a different desired user reaction time or a different desired time-to-takeover.

19. A method for controlling a user situation awareness modification of a user of a vehicle, the method comprising:
receiving a first user detection signal comprising information usable for determining a user situation awareness level;
determining a currently necessary situation awareness level by selecting one predefined situation awareness level from a plurality of predefined situation awareness levels based on driving information;
determining a current user situation awareness level based on the information usable for determining the user situation awareness level; and
generating a control signal to control a user situation awareness modification module based on the currently necessary situation awareness level and the current user situation awareness level,
wherein each of the plurality of predefined situation awareness levels is associated with a different desired user reaction time or a different desired time-to-takeover.

* * * * *